(12) United States Patent
Kao et al.

(10) Patent No.: US 7,507,009 B2
(45) Date of Patent: Mar. 24, 2009

(54) LIGHT GUIDE PLATE, AND BACKLIGHT MODULE AND LIQUID CRYSTAL DISPLAY COMPRISING THE SAME

(75) Inventors: Ko-Chia Kao, Pingtung County (TW); Jing-Huan Liao, Taoyuan (TW); Chih-Kuang Chen, Kaohsiung (TW); Jyh-Haur Huang, Pingtung County (TW)

(73) Assignee: AU Optronics Corp., Hsinchu (TW)

( * ) Notice: Subject to any disclaimer, the term of this patent is extended or adjusted under 35 U.S.C. 154(b) by 0 days.

(21) Appl. No.: 11/456,142

(22) Filed: Jul. 7, 2006

(65) Prior Publication Data

US 2007/0159852 A1    Jul. 12, 2007

(30) Foreign Application Priority Data

Jan. 10, 2006 (TW) ............................... 95100937 A

(51) Int. Cl.
*A47F 3/00* (2006.01)
(52) U.S. Cl. .................................................. 362/561
(58) Field of Classification Search ................ 362/561, 362/610, 615, 621, 625, 620; 349/65, 67, 349/62; 385/129
See application file for complete search history.

(56) References Cited

U.S. PATENT DOCUMENTS

| 5,005,108 | A  | * | 4/1991  | Pristash et al. ............... 362/602 |
| 5,854,872 | A  |   | 12/1998 | Tai et al. |
| 6,576,887 | B2 |   | 6/2003  | Whitney et al. |
| 7,221,847 | B2 | * | 5/2007  | Gardiner et al. ............. 385/146 |
| 7,230,764 | B2 | * | 6/2007  | Mullen et al. ............... 359/619 |
| 2003/0147259 | A1 | * | 8/2003 | Kraft ......................... 362/576 |

* cited by examiner

*Primary Examiner*—Ali Alavi
*Assistant Examiner*—Evan Dzierzynski
(74) *Attorney, Agent, or Firm*—Thomas, Kayden, Horstemeyer & Risley

(57) ABSTRACT

A light guide plate structure, for use with a back light module of a liquid crystal display, has a top surface, a bottom surface, a first end portion, a second end portion which is opposite the first end portion, and a plurality of substantially paralleled V-shape grooves formed on the bottom surface and extending from the first end portion to the second end portion. Each of said V-shape grooves comprises a top angle with a continuous variation from the first end portion to the second end portion. The present invention gets rid of the dark areas of an LCD that appear adjacent to one of the end portions in conventional models, thus enhancing the uniformity in its brightness levels.

11 Claims, 4 Drawing Sheets

1

1

| Distance | Angle | |
|---|---|---|
| 1 | 110 | 109.5849 |
| 2 | 111.3 | 111.4503 |
| 3 | 113.5 | 113.2866 |
| 4 | 115 | 115.0938 |
| 5 | 117 | 116.8718 |
| 6 | 117 | 118.6206 |
| 7 | 121 | 120.3403 |
| 8 | 122 | 122.0309 |
| 9 | 123 | 123.6922 |
| 10 | 125 | 125.3245 |
| 11 | 128 | 126.9276 |
| 12 | 129.5 | 128.5015 |
| 13 | 131 | 130.0463 |
| 14 | 131.6 | 131.5619 |
| 15 | 132 | 133.0484 |
| 16 | 134 | 134.5057 |
| 17 | 135 | 135.9339 |
| 18 | 138 | 137.3329 |
| 19 | 139 | 138.7027 |
| 20 | 140 | 140.0434 |

Relations and curve between top angles of gradually varying grooves (y) and distance (x)

| Brightness (nit) | R90 | R20 | R10 | R05 | R02 | ROBL |
|---|---|---|---|---|---|---|
| Equivalent Angle | 29262.4 | 9452.85 | 3193.29 | 862.501 | 120.238 | 3561.46 |
| 2-stage Angle | 39391.8 | 8961.45 | 2897.99 | 802.167 | 124.647 | 5211.83 |
| Complex Angle | 39464.6 | 8448.56 | 3072.03 | 1050.07 | 197.1 | 5563.33 |
| | | | | | | |
| Brightness Gain | R90 | R20 | R10 | R05 | R02 | ROBL |
| Equivalent Angle | 100.00% | 100.00% | 100.00% | 100.00% | 100.00% | 100.00% |
| 2-stage Angle | 134.61% | 94.80% | 90.75% | 93.01% | 103.66% | 146.34% |
| Complex Angle | 134.86% | 89.38% | 96.20% | 121.75% | 163.92% | 156.21% |

Brightness and brightness gain in various angles of view and grooves

US 7,507,009 B2

LIGHT GUIDE PLATE, AND BACKLIGHT MODULE AND LIQUID CRYSTAL DISPLAY COMPRISING THE SAME

This application claims the benefit of Taiwan Application Serial No. 095100937, filed Jan. 10, 2006, the subject matter of which is incorporated herein by reference.

CROSS-REFERENCES TO RELATED APPLICATIONS

Not applicable.

BACKGROUND OF THE INVENTION

1. Field of the Invention

The present invention relates to a light guide plate; more particularly, to a light guide plate for use with an edge type back light module of a liquid crystal display (LCD), and an LCD comprising the light guide plate.

2. Descriptions of the Related Art

Liquid crystal displays (LCDs) are mainstream products on the display market. Not only does it save power and emit low radiation, it is also lightweight and portable. It is widely used on appliances such as televisions, general monitors, laptops, global position systems (GPS), and mobile communicating devices. That being said, conventional monitors are gradually being replaced by LCDs.

The backlight module is one of the key components for providing uniform and sufficient lights for an LCD panel. A conductive type backlight module primarily comprises a lamp, lens sheet (or prism sheet), light guide plate, diffusion sheet, reflect sheet, protective film, and optical film.

Backlight modules are divided into two categories, namely, direct types and edge types. An illumination device for use with the edge type backlight module is disposed on the outer edge of the light guide plate. A reflector is disposed under the light guide plate for gathering and reflecting lights through the panel. In comparison, the edge type backlight module has the benefit of being slimmer than the direct type. Moreover, the edge type also has fewer heat problems.

A backlight module demands uniform and high brightness levels, low cost, and light weight. Thus, the market is apt to employ the edge type backlight module because certain dimensions of LCDs comprising the edge type module have those advantages. However, a conventional light guide plate that forms uniform V-shape grooves for guiding lights to a light output plane tends to cause dark areas adjacent to the light input plane. The uniformity of the overall brightness is, therefore, hard to control.

FIG. 1A is a conventional light guide plate that has uniform V-shape grooves (i.e. the top angles of the V-shape grooves are equivalent between the two opposing end portions of the light guide plate, i.e. $y_1 = y_{20}$). FIG. 1B is a schematic view illustrating the dark areas adjacent to the light input portion in view of FIG. 1A. An illumination device 1 (preferably a tube lamp) emits lights into the light guide plate 2 through a first end portion 24 of the light guide plate 2. Initially, the lights in the light guide plate 2 usually travel in a total-reflections manner, following Snell's Law. Soon after, the total-reflections gradually diminish and the lights continuously travel in reflection and refraction paths, wherein the refractive lights emit from a top surface 22 as visible lights. Accordingly, the more frequently the total reflections occur in the light guide plate 2, or the more delay time between reflection and refraction paths, the less frequently the refractive lights will emit from the effective displaying area. It follows that the dark areas will increase and the high performance visible region will decrease, which means that the brightness of the overall display is not uniform. FIG. 1B shows the dark areas occurring at the light input portions according to the above-mentioned problems. These problems negatively affect the products' performances in brightness and quality.

To diminish total reflections early on when the lights travel in the light guide plate, a design that modifies this light guide plate (as shown in FIG. 2) so that it has a tapered shape (as shown in FIG. 3) is further created to initially introduce the lights refracting out of the light guide plate, thereby reducing the undesired dark areas adjacent to the illumination device 1.

Other similar designs have been developed as well. For example, U.S. Pat. No. 5,485,354 discloses a light guide plate that has a uniform thickness and a plurality of V-shape grooves formed thereon with equivalent top angles. The V-shape grooves are formed parallel to the light input plane (which is adjacent to the tube lamp). The light guide plate, therefore, transmits the lights from the tube lamp to the light output plane. Another example, U.S. Pat. No. 6,576,887, discloses a gradually tapered light guide plate that has a plurality of trapezoidal grooves formed parallel to the light input plane (which is adjacent to a tube lamp). Likewise, the light guide plate transmits the lights from the tube lamp to the output plane.

However, too many total-reflections still exist in the light paths that run within the light guide plate in the mentioned conventional designs. These problems do not match the needs of a high quality product that demands uniform brightness in the overall display area.

Thus, a novel structure that further reduces the dark areas on the edges, widens the viewing angles, and improves the overall uniformity in brightness, is required in this field.

SUMMARY OF THE INVENTION

The primary objective of this invention is to provide a light guide plate for use in a liquid crystal display (LCD). The present invention is disclosed to diminish total-reflection areas adjacent to the plane of light incidence by forming a plurality of parallel V-shape grooves, which are formed on the bottom surface of the light guide plate. The top angles gradually vary by increasing from one end portion to the other opposing end portion.

Another objective of this invention is to provide a backlight module for use in an LCD by using the novel light guide plate as mentioned to diminish the dark areas on the edges of the backlight module.

Yet a further objective of this invention is to provide an LCD comprising the mentioned backlight module and a liquid crystal panel disposed above the backlight module to make the brightness uniform in the display area of the LCD.

According to the present invention, the V-shape grooves with gradually varying top angles is adapted to efficiently reduce total-reflections and introduce opportunities for earlier light refraction after the lights enter the light guide plate. Lights that initially travel in the light guide plate would immediately have the chance to refract into visible lights and therefore diminish dark areas adjacent to the plane of light incidence, thereby enhancing the uniformity of the brightness of the whole display.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1A:
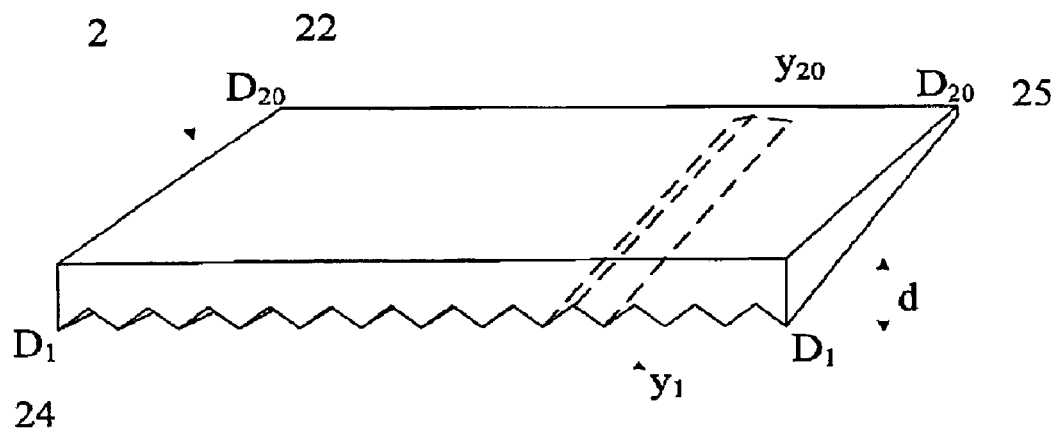
FIG. 1A is a schematic view illustrating a conventional light guide plate with uniform V-shape grooves.
Figure 1B:
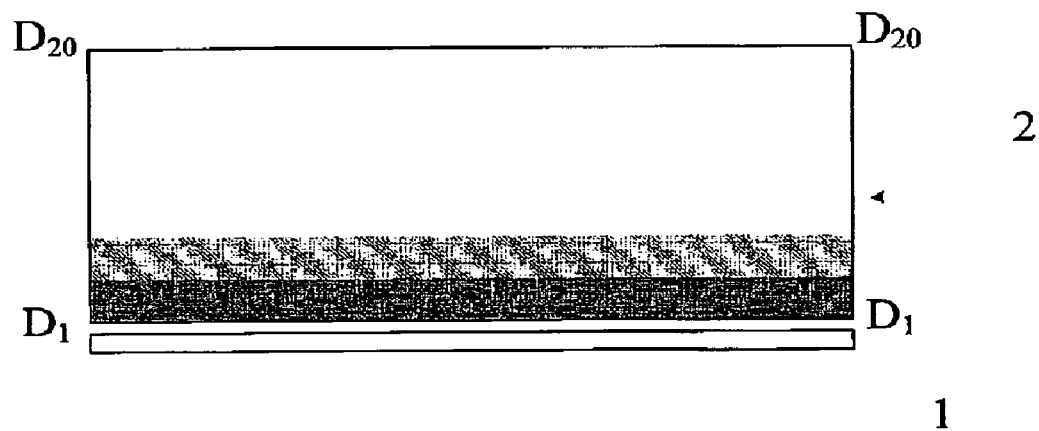
FIG. 1B is a schematic view illustrating the bright/dark areas in view of FIG. 1A.
Figure 2:
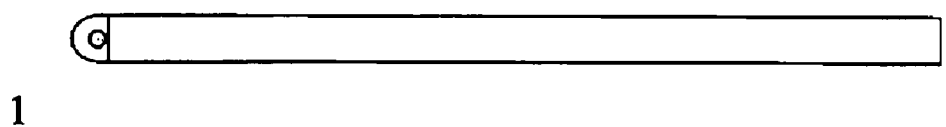
FIG. 2 is a schematic view illustrating frequent total-reflective paths in a conventional light guide plate that has a uniform thickness.
Figure 3:
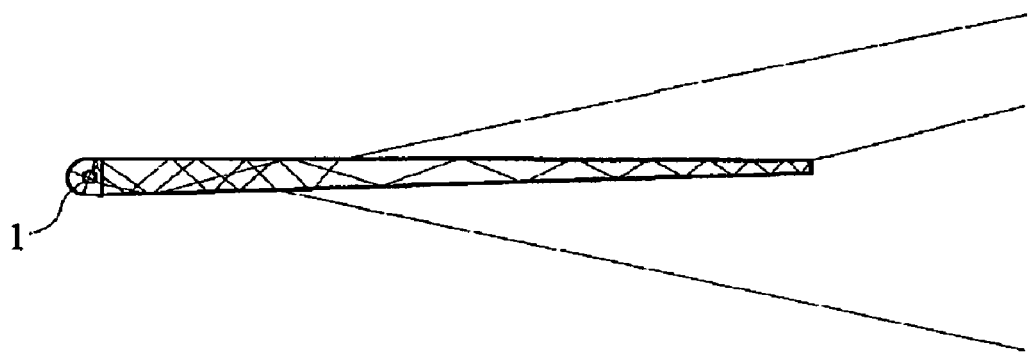
FIG. 3 is a schematic view illustrating rare total-reflective paths in a conventional tapered light guide plate that has a gradually converging thickness.
Figure 4:
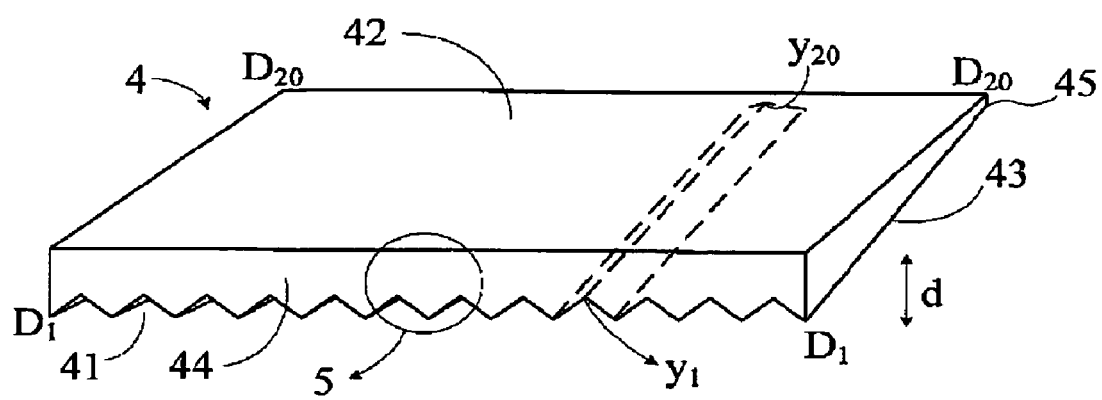
FIG. 4 is a schematic view illustrating the light guide plate that has V-shape grooves with gradually increasing top angles according to the present invention.

FIG. 4 shows a preferred embodiment of the light guide plate of the present invention. The tapered profile of the V-shape grooves is gradually increasing top angles. More specifically, the light guide plate 4 has a top surface 42, namely a light output plane of the light guide plate 4, a bottom surface 43, a first end portion 44 where the lights enter into the light guide plate 4, and a second end portion 45 opposing to the first end portion 44. A plurality of V-shape grooves formed on the bottom surface 43 of the light guide plate 4 are substantially parallel and extends from the first end portion 44 to the second end portion 45. Each V-shape groove 41 has a top angle y which is varying, preferably, gradually increasing, from the first end 44 ($D_1$) to the second end 45 ($D_{20}$). The design of the V-shape groove 41 with the gradually increasing top angle makes it possible for the lights to refract early on from the first end 44 to and out from the top surface 42 to provide visible lights for an LCD.

The thickness of the above-mentioned light guide plate 4 is designated as d. Preferably, the thickness d gradually converges from the first end portion 44 to the second end portion 45.

Figure 5:
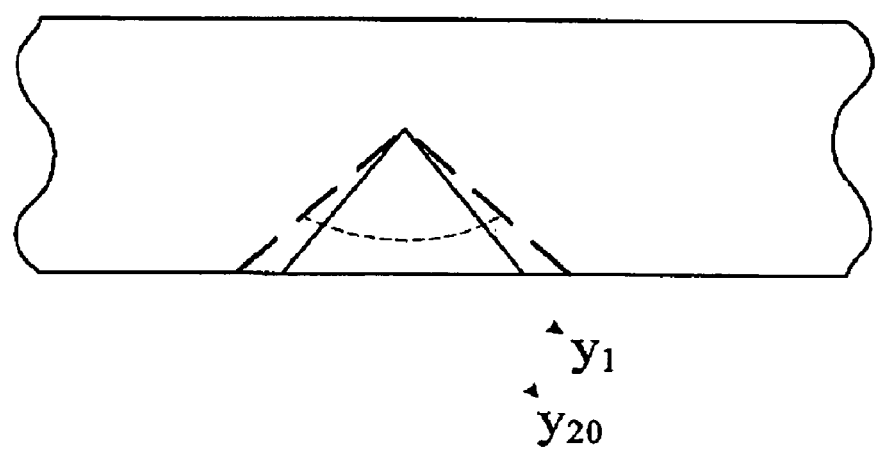
FIG. 5 is a schematic end view illustrating V-shape grooves at opposing ends of the light guide plate according to the present invention.

A localized region 5 could be enlarged and schematically shown in FIG. 5. FIG. 5 is an end view illustrating the V-shape groove 41 of the light guide plate 4 of the present invention. The V-shape groove 41 is designed with a gradually increasing top angle, from the first end portion 44, which is adjacent to an illumination device, to the second end portion 45 (i.e. $y_1$ to $y_{20}$).

The effects of the present invention could be realized after experiments are performed in point of the mentioned structure. The width measured from the first end portion 44 to the second end portion 45 is divided into 20 segments (x=1 to 20), with the gradually increasing top angles (y) following the optical simulation equation:

$$y=-0.0146x^2+1.9092x+107.69 \tag{1}$$

Figures 6, 7:
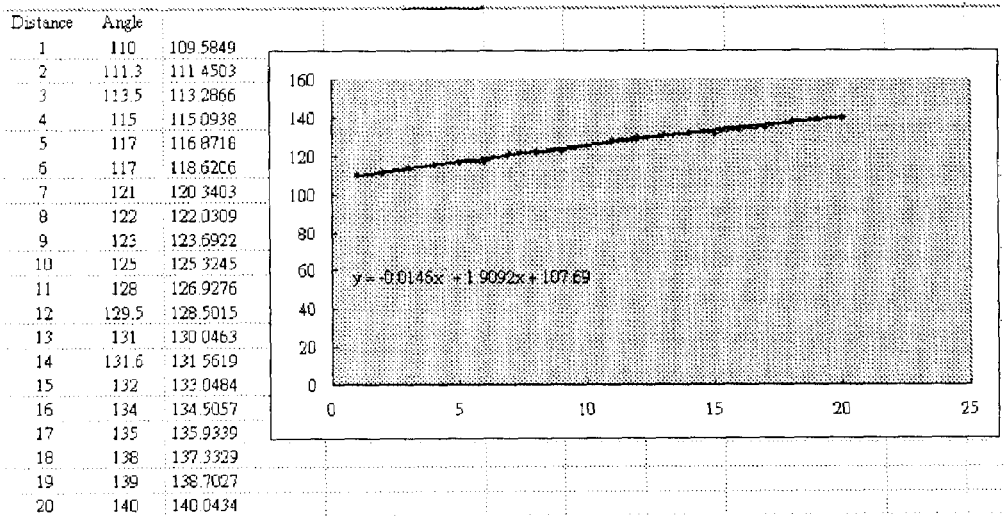
FIG. 6 is a table showing the correspondences between distances and top angles of the V-shape groove.
FIG. 7 is a table showing brightness and gains in various angles of view.

The correspondences between x and y are shown in FIG. 6. The first column "Distance 1~20" shows 20 segments (i.e. $D_1$~$D_{20}$). The third column in FIG. 6. shows the top angles y of the V-shape grooves 41 obtained from equation (1). The actual top angles (y) of the V-shape grooves are shown in the second column. The V-shape groove 41 has a top angle of 110° on the first end portion 44 (namely $D_1$), that is to say, y1=110°. The V-shape groove 41 also has a top angle of 140° on the second end portion 45 (namely $D_{20}$), that is to say, $y_{20}$=140°. A curve illustrating the angle variation is also shown in FIG. 6.

According to the above mentioned angle variations of the V-shape groove and the implementation of the optical simulation on the visual angle of view of an LCD, levels of brightness and gains in various angles of view are shown in FIG. 7. Angles between the line of user's sight and normal of the light output plane are shown in rows. For example, R90 represents the angles of view at ±45° in view of the normal on the plane of emergence. Similarly, R05 represents the angles of view at ±2.5° and R02 represents the angles of view at ±1° in view of the normal on the light output plane. Three kinds of grooves—Equivalent Angle (groove angle without variation), 2-stage Angle (groove angle that varies at two stages only along the width), and Complex Angle—are implemented and shown in columns in FIG. 7. The Complex Angle, which is the groove angle that frequently varies, is the one used according to the present invention.

From the front, angles of view that are 5° (±2.5°) or 2° (±1°) are most frequently adopted by the user. In general, the brightness has better performance as shown by the angles of views within 5°. FIG. 7 shows the brightness that is measured as 1050.07 nit and 197.1 nit by the angles of views 5° and 2°, respectively. In comparison, measured brightness from equivalent grooves in the conventional methods is 862.501 nit and 120.238 nit. Using complex angles, the grooves in the present invention could increase brightness by 21.75% in 5° (±2.5°) and 63.92% in 2° (±1°). Similar conclusions could be obtained when the angle of view is 90° (±45°).

Another embodiment of the present invention is a backlight module for use with an LCD. Edge type backlight modules are particularly valued in medium-size LCDs due to a smaller thickness and fewer undesired heat problems. The backlight module of the present invention comprises the mentioned light guide plate and an illumination device (preferably a tube lamp). The illumination device is disposed onto a lateral side of the light guide plate 4 (preferably on the outside of the mentioned first end portion 44) for providing a projection light source from the first end portion 44 to the second end portion 45.

Still another embodiment of the present invention is a liquid crystal display (LCD) comprising the mentioned backlight module and a liquid crystal panel disposed above the backlight module. The preferable panel according to the above embodiments ranges from 15 inch to 19 inch.

With the top angle y of the V-shape groove that varies from the first end portion 44 to the second end portion 45, a desired reduction of the dark areas and increase in uniformity of brightness may be achieved. In the case that the top angle y of the V-shape groove gradually increases from the first end portion 44 to the second end portion 45, either the height of the triangle cross section of the groove will gradually decrease with the increasing top angle under a constant hemline, or the hemline of the triangle will gradually increase with the increasing top angle under a constant height. Either option can still perform the desired function in the above embodiment.

The above disclosure relates to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A light guide plate having:
   a light output surface;
   a bottom surface opposite to the light output surface;
   a first end portion; and
   a second end portion opposite to the first end portion;
   wherein the bottom surface is formed with a plurality of substantially paralleled V-shaped grooves, each of which is inwardly indented from the bottom surface to form a top angle proximal to the light output surface in a way that each of the grooves extends from the first end portion to the second end portion, and each of the V-shaped grooves with the top angle gradually varying from the first end portion to the second end portion.

2. The light guide plate as claimed in claim 1, having a profile gradually tapered from the first end portion to the second end portion.

3. The light guide plate as claimed in claim 1, wherein the top angle is gradually greater from the first end portion to the second end portion.

4. The light guide plate as claimed in claim 1, wherein the top angle is about 110 degrees at the first end portion and about 140 degrees at the second end portion.

5. A backlight module comprising:
   a light guide plate, having:
      a light output surface;
      a bottom surface opposite to the light output surface;
      a first end portion; and
      a second end portion disposed opposite to the first end portion;
      wherein the bottom surface is formed with a plurality of substantially paralleled V-shaped grooves, each of which is inwardly indented from the bottom surface to form a top angle proximal to the light output surface in a way that each of the grooves extends from the first end portion to the second end portion, and each of the V-shaped grooves with the top angle gradually varying from the first end portion to the second end portion; and
   an illumination device disposed on a side of the light guide plate to provide light from the first end portion to the second end portion.

6. The backlight module as claimed in claim 5, wherein the light guide plate has a profile gradually tapered from the first end portion to the second end portion.

7. The backlight module as claimed in claim 6, wherein the top angle is gradually greater from the first end portion to the second end portion.

8. The backlight module as claimed in claim 5, wherein the top angle is gradually greater from the first end portion to the second end portion.

9. The backlight module as claimed in claim 5, wherein the top angle is about 110 degrees at the first end portion and 140 degrees at the second end portion.

10. A liquid crystal display comprising the backlight module as claimed in claim 5 and a liquid crystal panel disposed above the backlight module.

11. The liquid crystal display as claimed in claim 10, wherein the liquid crystal panel has a dimension between about 15 inches and about 19 inches.

* * * * *